April 13, 1926. 1,580,478
G. B. FOX ET AL
ATTACHMENT FOR AUTOMATICALLY OPERATING SPRAYING
GUNS OF POWER DRIVEN SPRAYING PUMPS
Filed May 23, 1925    2 Sheets-Sheet 1
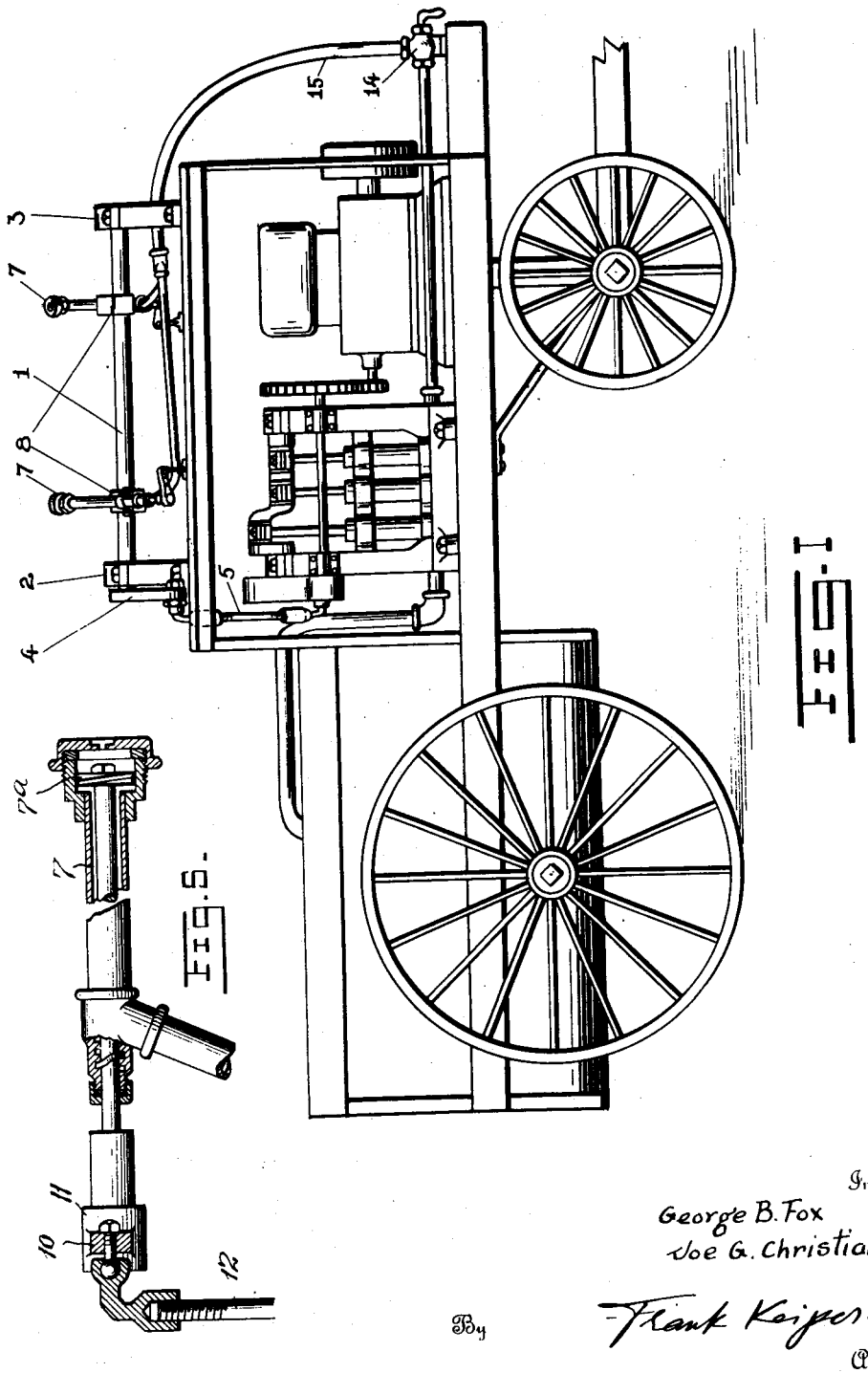
Inventor
George B. Fox
Joe G. Christian
By Frank Keiper.
Attorney April 13, 1926.
G. B. FOX ET AL
ATTACHMENT FOR AUTOMATICALLY OPERATING SPRAYING
GUNS OF POWER DRIVEN SPRAYING PUMPS
Filed May 23, 1925
1,580,478
2 Sheets-Sheet 2
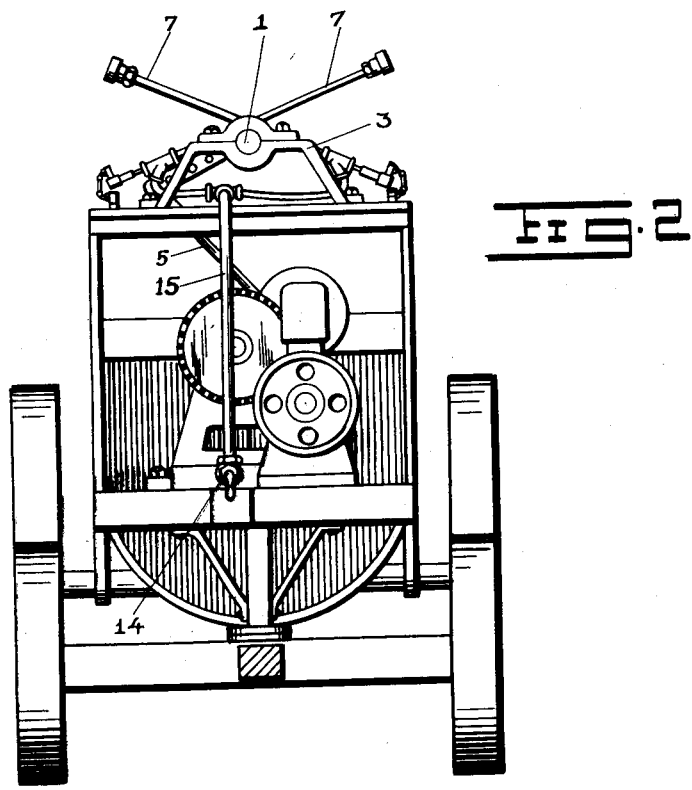
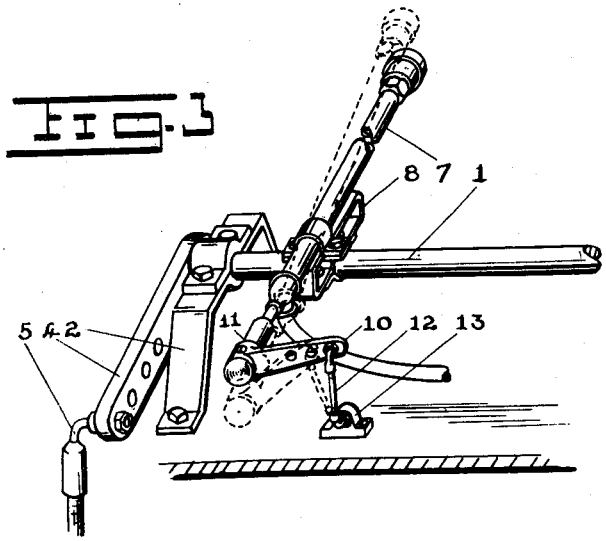
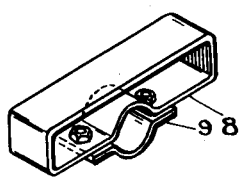
Inventor
George B. Fox
Joe G. Christian
Frank Keiper
Attorney Patented Apr. 13, 1926.

1,580,478

UNITED STATES PATENT OFFICE.

GEORGE B. FOX AND JOE G. CHRISTIAN, OF WOLCOTT, NEW YORK.

ATTACHMENT FOR AUTOMATICALLY OPERATING SPRAYING GUNS OF POWER-DRIVEN SPRAYING PUMPS.

Application filed May 23, 1925. Serial No. 32,488.

*To all whom it may concern:*

Be it known that GEORGE B. Fox and JOE G. CHRISTIAN, citizens of the United States, residing at Wolcott, in the county of Wayne and State of New York, have invented certain new and useful Improvements in Attachments for Automatically Operating Spraying Guns of Power-Driven Spraying Pumps, of which the following is a specification.

The object of this invention is to provide a power spraying machine used for spraying fruit trees with an attachment for mounting and operating the spraying guns so that they will automatically direct the spraying material to cover the trees from top to bottom therewith, as the spraying machine is moved past the tree.

This and other objects of this invention will be fully illustrated in the drawings, described in the specification and pointed out in the claims at the end thereof.

In the accompanying drawings:

Figure 1 is a side elevation of a power spraying machine with the spraying attachment mounted on the top thereof.

Figure 2 is a front elevation of the power spraying machine and the attachment mounted thereon.

Figure 3 is a detail perspective view of the attachment.

Figure 4 is a detail perspective view of the bracket on which the spraying gun is mounted.

Figure 5 is a partial sectional view of one of the spraying guns showing the valve thereof.

In the several figures of the drawings like reference numerals indicate like parts.

The practice in spraying trees with power spraying machinery is to provide a power driven pump with a so called spraying gun comprising a suitable nozzle having a regulating valve. This gun is handled manually and is pointed at will against the tree to cover it with the spraying material. This is a slow process as it requires a man for handling each gun who can do nothing more than simply point the gun in the proper direction to cover the whole of the tree. The attachment forming the subject matter of my present invention eliminates the manual handling of the spraying gun making it possible to spray an orchard in shorter time and with less labor. It also places the gun or guns in such a position where in the event of the bursting of the gun or the bursting of the hose leading to it, the spraying material will not be thrown into the eyes of the operator or operators of the spraying machinery. The pressure used in spraying is from 300 to 400 pounds per square inch and the danger of bursting under this great pressure is therefore always present.

As illustrated in the figures of the drawing, especially Figure 3 the attachment comprises an oscillating shaft 1 that is mounted to oscillate in bearings provided in the brackets 2 and 3. These brackets are mounted on top of the housing containing the spraying machinery. To the outer end of the oscillating shaft is keyed or otherwise suitably fastened the crank 4 which crank is connected to one of the driving gears of the pump or engine of the sprayer by means of the connecting rod 5. This connecting rod is provided at both ends with a universal joint so that no matter how the shaft 1 with its crank 4 is mounted with relation to the driving gear the connecting rod will adjust itself thereto and drive the crank from the driving gear without binding. The universal joint illustrated at the ends of the connecting rod 5 is formed by a ball and socket joint similar to that illustrated in section in Figure 5.

The spraying guns 7, 7 are mounted on the oscillating shaft by means of adjustable brackets 8, 8. These brackets as illustrated in the drawings are bent up of sheet metal being provided with a flat top to which the spraying gun can be clamped, and a semi-circular depression at the bottom that is adapted to be clamped to the oscillating shaft by means of the strap 9. By loosening the strap 9 on the bracket it can be shifted to any desired angular position so as to set the spraying gun to spray at the proper elevation corresponding to the height of the trees to be sprayed.

As the lower end of the foliage of the trees to be sprayed is much closer to the spraying gun as it is being directed against the tree it is necessary to control the spray as it leaves the gun, that is, make the gun spray a stream large enough and powerful enough to carry the spraying material to the tops of the tree as well as reduce the power of this stream and spread it when pointing to the lower position of the tree so as not to simply force the spraying material thru the foliage but spray it on it.

In hand operated spraying guns this is done by turning the handle of the gun in order to operate a valve provided in the nozzle thereof as indicated at 7^A in Figure 5. Thus when a powerful stream is needed to reach the top of the trees the handle of the gun is turned in one direction to open the nozzle of the gun and when a less powerful stream is needed and more area is to be covered, the handle of the gun is turned in the other direction. This action is automatically secured by the crank 10 that is attached to the end of the handle 11 of the spraying gun 7. This crank has the link 12 connected thereto, which in turn is pivoted on the stationary lug 13 mounted on the roof of the power spraying machine. When, therefore, the spraying gun is oscillated on the oscillation of the shaft 1 the link 12 operates to turn the handle first in one direction and then in the other direction and open the spraying gun to increase the spray as the gun is being pointed upwardly and decrease the spray during its return movement when the spraying gun is being pointed lower down.

As illustrated in Figure 1, the pipe leading from the pump thru which the spraying material is pumped is extended to the front of the spraying rig and is provided with the valve 14 on the end thereof. From the valve the hose 15 leads to the spraying guns so that by manipulating the valve, the spraying material can be allowed to flow to the guns or be shut off from them. This is desirable whenever the spraying machine is being pulled from one tree or row of trees to another, in fact at any point where the spraying material issuing from the nozzle would be forced into space instead of against a tree. By locating the control valve at the front end of the rig carrying the spraying machinery it can be readily operated by the driver of the tractor used for pulling the spraying machinery and suitably attached to the front thereof.

We claim:

1. In an attachment for automatically directing and controlling the spray of power driven spraying pumps, the combination of an oscillating shaft oscillated on the operation of the pump, a spraying gun mounted on said oscillating shaft a valve carried by the spraying gun a stationary lug, and means connecting said valve with said stationary lug to operate said valve to shorten and lengthen the spray from said gun at each oscillation thereof.

2. In an attachment for automatically directing and controlling the spray of power driven spraying pumps having a rotating member, the combination of an oscillating shaft, a crank provided on said oscillating shaft, a connecting link, a universal connection at each end of said connecting link, one of said universal connections being attached to said crank and the other universal connection being attached to said rotating member of said power driven pump, a bracket mounted on said oscillating shaft, means for angularly adjusting said bracket on said oscillating shaft, a spraying gun mounted on said bracket, and means for increasing and decreasing the spraying stream from the gun on the oscillation thereof.

3. In an attachment for automatically directing and controlling the spray of power driven spraying pumps having a rotating member, the combination of an oscillating shaft, a crank provided on said oscillating shaft, a connecting link, a universal connection at each end of said connecting link, one of said universal connections being attached to said crank and the other universal connection being attached to said rotating member of said power driven pump, a bracket mounted on said oscillating shaft, means for angularly adjusting said bracket on said oscillating shaft, a spraying gun mounted on said bracket, a rotating handle on said spraying gun for controlling the spray of said gun, a crank carried by said handle, a link connected to said crank on said handle, said link being adapted to hold said crank stationary and cause said handle to rotate on the oscillation of said gun.

4. In an attachment for automatically directing the spray of power driven spraying pumps, the combination of an oscillating horizontal shaft, an angularly adjustable bracket mounted on said shaft, a spraying gun fastened to said bracket and means for oscillating said oscillating shaft.

5. In an attachment for automatically directing the spray of power driven spraying pumps, the combination of a frame, a horizontal shaft mounted to oscillate in said frame, a series of brackets clamped to said oscillating shaft, spraying guns carried by said brackets, said spraying guns being adapted to point in opposite directions on said oscillating shaft.

6. In an attachment for automatically directing the spray from power driven spraying pumps, the combination of an oscillating horizontal shaft, an angularly adjustable bracket mounted on said shaft, a spraying gun fastened to said bracket, means for oscillating said oscillating shaft, a valve in said spraying gun, a handle at the inner end of said gun adapted to regulate said valve, a link held stationary with one end thereof and connected to said handle with the other end thereof, said link being adapted to oscillate said handle and open and close said valve on the oscillating of said oscillating shaft.

7. In an attachment for automatically directing the spray of power driven spraying pumps, the combination of an oscillating horizontal shaft, an angularly adjustable bracket mounted on said shaft, a spraying gun fastened to said bracket and means for oscillating said oscillating shaft, and means for adjusting the angular elevation of said spraying guns on said oscillating shaft.

In testimony whereof we affix our signatures.

GEORGE B. FOX.
JOE G. CHRISTIAN.